(12) United States Patent
Yoshida

(10) Patent No.: US 6,761,462 B2
(45) Date of Patent: Jul. 13, 2004

(54) BUTTON FOR AN ELECTRIC DEVICE AND METHOD OF CONTROLLING LIGHTING OF THE BUTTON

(75) Inventor: Masao Yoshida, Saitama (JP)

(73) Assignee: Pioneer Corporation, Tokyo (JP)

(*) Notice: Subject to any disclaimer, the term of this patent is extended or adjusted under 35 U.S.C. 154(b) by 0 days.

(21) Appl. No.: 09/817,235

(22) Filed: Mar. 27, 2001

(65) Prior Publication Data

US 2001/0026446 A1 Oct. 4, 2001

(30) Foreign Application Priority Data

Mar. 28, 2000 (JP) ................................ P. 2000-089210

(51) Int. Cl.[7] .............................................. F21V 33/00
(52) U.S. Cl. ...................... 362/109; 362/88; 362/24; 362/85
(58) Field of Search .................... 362/24, 109, 23, 362/85, 551, 559; 341/22, 23, 28; 345/170, 171; 40/444, 442

(56) References Cited

U.S. PATENT DOCUMENTS

| | | | | |
|---|---|---|---|---|
| 2,614,162 A | * | 10/1952 | Smith | .......................... 177/377 |
| 5,404,133 A | | 4/1995 | Moriike et al. | |
| 5,510,782 A | * | 4/1996 | Norris et al. | .................. 341/22 |
| 5,710,545 A | * | 1/1998 | Dunn | .......................... 340/825 |
| 5,914,676 A | * | 6/1999 | Akpa | ........................... 341/23 |
| 5,950,809 A | | 9/1999 | Andre | |
| 6,092,903 A | * | 7/2000 | Higgins, Jr. | .................. 362/30 |
| 6,217,183 B1 | * | 4/2001 | Shipman | ...................... 362/30 |
| 6,310,609 B1 | * | 10/2001 | Morgenthaler | .............. 345/170 |

FOREIGN PATENT DOCUMENTS

| | | |
|---|---|---|
| EP | 0 508 563 A1 | 10/1992 |
| GB | 2 304 439 A | 3/1997 |
| JP | 58086626 A * 5/1983 | ............. G06F/3/02 |
| JP | 03-164922 A | 7/1991 |

OTHER PUBLICATIONS

European Search Report.

* cited by examiner

Primary Examiner—Sandra O'Shea
Assistant Examiner—Sharon Payne
(74) Attorney, Agent, or Firm—Sughrue Mion, PLLC

(57) ABSTRACT

In a button for an electronic device, a red numeral pattern 21, a green kana pattern 31 and a black English character pattern 41 are printed on a key top 11 as plural kinds of patterns. By selectively causing a red LED 51 and a green LED 52 that function as a light source of a backlight to emit a light, red, green and orange lighting colors of the backlight are obtained. According to the color of the pattern used according to a mode, the lighting color of the backlight is switched.

14 Claims, 2 Drawing Sheets

| PATTERN KIND | PRINTED COLOR | BACKLIGHT LIGHTING COLOR | | |
|---|---|---|---|---|
| | | RED | GREEN | ORANGE |
| KANA PATTERN | GREEN | KANA INPUT | – | – |
| ENGLISH CHARACTER PATTERN | RED | – | ENGLISH CHARACTER INPUT | – |
| NUMERAL PATTERN | BLACK | – | – | NUMERAL INPUT |

BUTTON FOR AN ELECTRIC DEVICE AND METHOD OF CONTROLLING LIGHTING OF THE BUTTON

BACKGROUND OF THE INVENTION

1. Field of the Invention

The present invention relates to a button for an electronic device such as a portable telephone, a remote controller, a portable information terminal, or the like, and particularly to a button having a lighting means for lighting the button and a method of controlling the button lighting.

2. Description of the Related Art

In an electronic device, and particularly in a portable telephone, a remote controller and the like that are typical of a small-sized portable information terminal, miniaturization and multi-functionalization progress, so that a method that assigns a plurality of parts to one button is used. On the other hand, there is also provided the structure in which a button portion is lighted so that the button can be operated even in a dark spot.

Since the plural parts are assigned to one button, the different kinds of patterns according to their parts are provided in one button. Such the button requires consideration of preventing operational efficiency of the button from decreasing.

SUMMARY OF THE INVENTION

An object of the invention is to provide a button for an electric device and a method of controlling the lighting of the button which eliminate the above-mentioned problems.

In order to solve the above problem, a button of an electronic device according to the invention is characterized in that in the button of the electronic device including a button in which the plural patterns are displayed in one key top and a lighting means for lighting the button, the plural patterns are colored with a plurality of different colors, and that the lighting means includes a plurality of different luminous colors of which the number is the same as that of the plural patterns.

Further, in order to solve the above method, a lighting controlling method of a button in an electronic device according to the invention is characterized in that in the method for controlling lighting of button in the electronic device including a button in which plural patterns colored with a plurality of different colors are displayed in one key top, and a lighting means for lighting the button with a plurality of different luminous colors of which the number is the same as that of the plural patterns, lighting of the lighting means is controlled so that the luminous color is different from the color of the pattern utilized in the set mode.

DETAILED DESCRIPTION OF THE PREFERRED EMBODIMENTS

Figure 3:
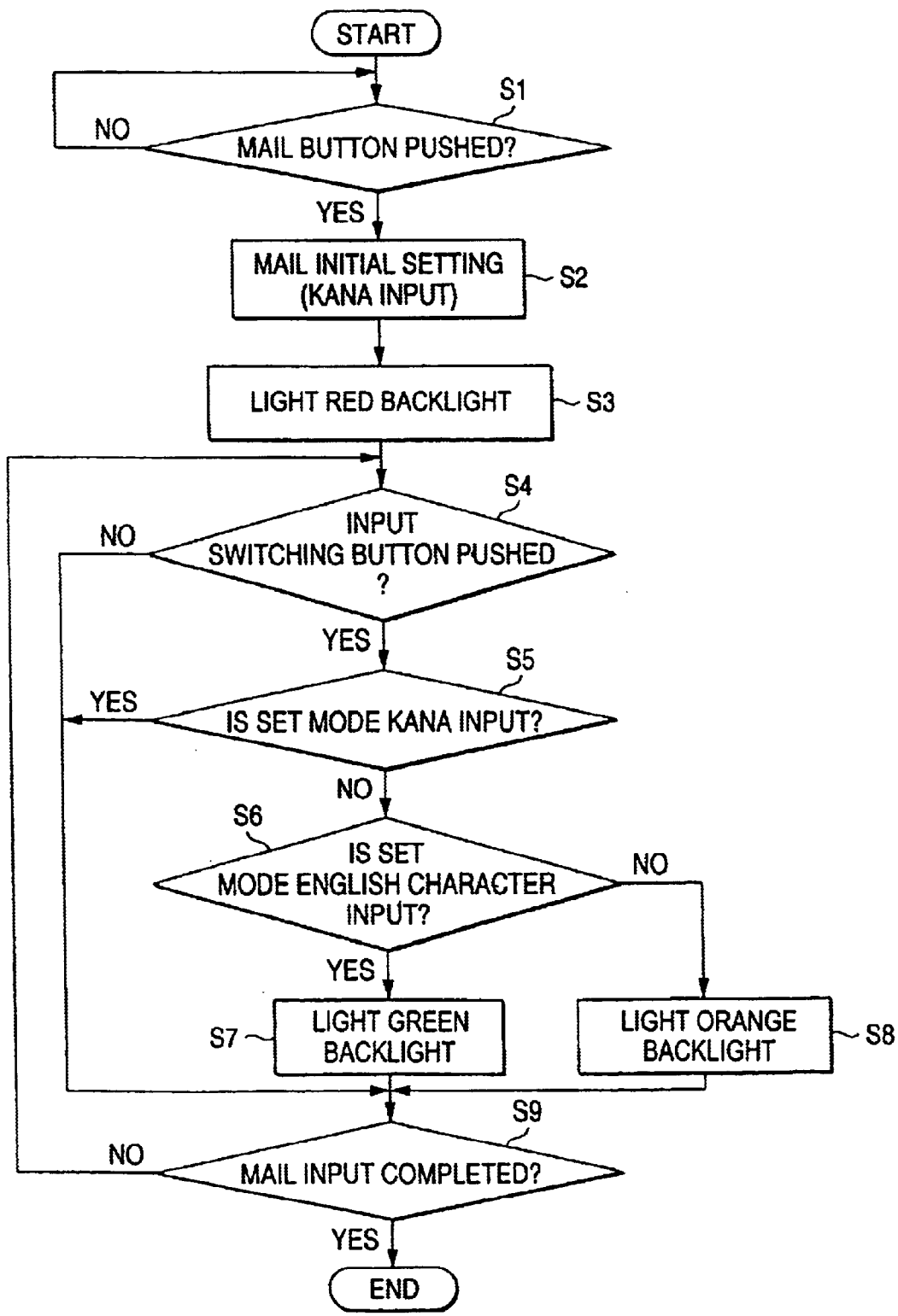
FIG. 3 is a flowchart showing alighting controlling method of the portable telephone according to the embodiment of the invention.

An embodiment of the invention will be described below in detail with reference to FIGS. 1 to 3.

Figures 1, 2:
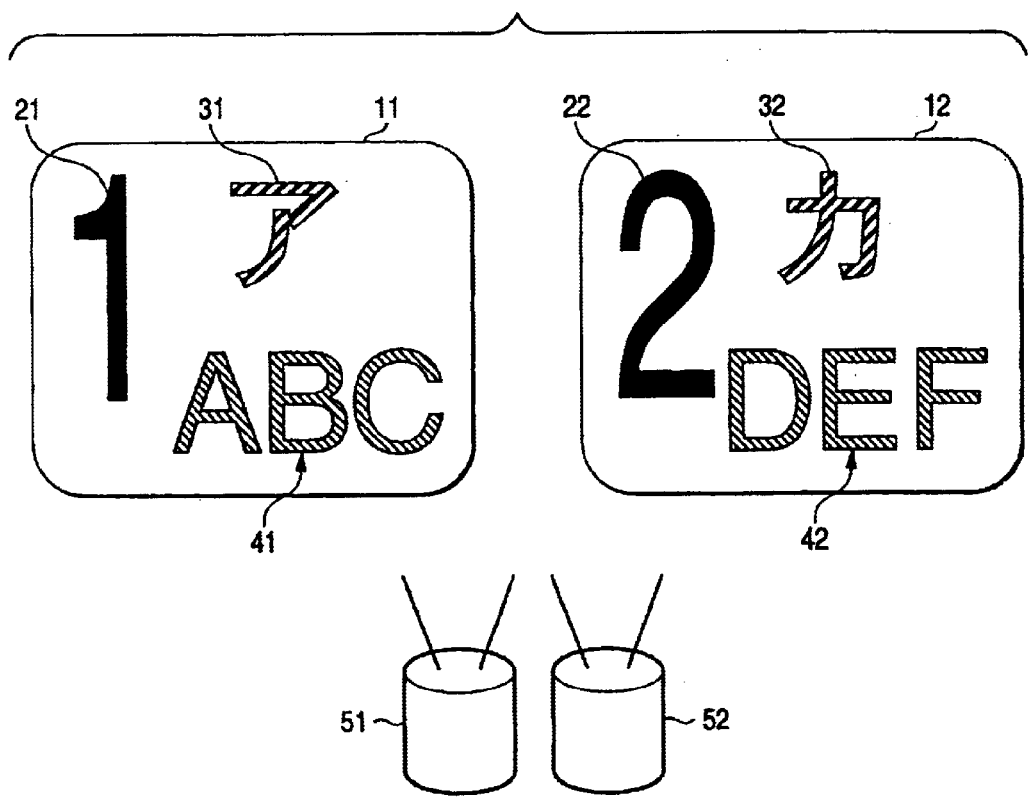
FIG. 1 is a diagram showing the structure of a button provided for a portable telephone according to an embodiment of the invention.
FIG. 2 is a diagram showing the relation among a pattern color of the button of the portable telephone according to the embodiment of the invention, a lighting color of a backlight, and a mode.

FIG. 1 shows the structure of a button provided for a portable telephone according to this embodiment; FIG. 2 shows the relation among a pattern color of the button, a backlight lighting color, and a mode; and FIG. 3 is a flowchart showing a method for controlling lighting of the button.

In FIG. 1, each of key tops 11, 12 of plural buttons provided for a portable telephone is made of transparent or semitransparent resin material, which can transmit a light emitted from a red LED 51 and a green LED 52 which function as a lighting means. A box body in which the buttons are placed is formed of material that cannot transmit the lights, whereby when the lighting means of the button emits the light, only the buttons can be lighted.

In these key tops 11, 12, numeral patterns 21, 22, Japanese character (kana) patterns 31, 32, and English character patterns 41, 42 are displayed. The structure in which the plural patterns are thus displayed in one key top can be achieved by printing the patterns on the inside surface of the key top. Such the technology has been disclosed in, for example, JP-A-9-82174.

Further, when these patterns are printed, the numeral patterns 21, 22 are printed with a black paint, the kana patterns 31, 32 are printed with a green paint, and the English character patterns 41, 42 are printed with a red paint.

As a light source of the lighting means for lighting these plural buttons from their backsides (the inside of the box body), there are provided the red LED 51 and the green LED 52. By causing these LED of two colors to emit the light selectively or simultaneously, backlights of three lighting colors; red, green and orange can be obtained.

Next, referring to FIG. 2, the relation among a pattern color of the button, a backlight lighting color, and a mode will be described. When characters for mail writing (i.e. writing electronic mail) are input in the portable telephone, kana input, English character input and numeral input can be selected according to the input character and a character converting method. Setting of the mode means setting of each of the kana input, English character input and numeral input.

In the portable telephone of this embodiment, when the kana input, the English character input or the numeral input is selected, the lighting color of the backlight is switched according to the selected input mode. Specifically, when the kana input is selected, the red LED 51 is caused to emit the light and the lighting color of the backlight becomes red; when the English character input is selected, the green LED 52 is caused to emit the light and the lighting color of the backlight becomes green; and when the numeral input is selected, both the red LED 51 and the green LED 52 are caused to emit the light and the lighting color of the backlight becomes orange.

Further, regarding the printing color of the button, as described before, the numeral patterns 21, 22 are printed with black, the kana patterns 31, 32 are printed with green, and the English character patterns 41, 42 are printed with red. Accordingly, by the relation between the printing color and the lighting color of the backlight, the following working can be obtained.

When the kana input is selected, the lighting color of the backlight is red. Therefore, the English character patterns 41, 42 printed with red are hard to see. To the contrary, the kana patterns 31, 32 printed with green are conspicuous since green and red are complementary.

Similarly to this, when the English character input is selected, the lighting color of the backlight is green. Therefore, the kana patterns 31, 32 printed with green are hard to see. To the contrary, the English character patterns 41, 42 printed with red are conspicuous since red and green are complementary.

Further, when the numeral input is selected, the lighting color of the backlight is orange. Therefore, the kana patterns 31, 32 printed with green and the English character patterns 41, 42 printed with red are hard to see. To the contrary, the numeral patterns 21, 22 printed with black are conspicuous since black and orange are complementary.

Next, referring to the flowchart shown in FIG. 3, a lighting controlling method of this button will be described. Firstly, whether a mail button for proceeding to a mail-creating mode (i.e. an e-mail creating mode) is pushed by a user or not is judged (step S1). Here, in case that it is judged that the mail button is not pushed (in case of no), the procedure returns again to the step S1 and it is in waiting state in this step till the mail button is pushed.

If it is judged that the mail button is pushed (In case of yes), the portable telephone enters the mail creating mode and the kana input is set as an initial input state (step 2). Next, the red LED 51 is caused to emit the light so that the lighting color of the backlight becomes red.

In this state, in the key tops 11, 12 that are lighting up in red, the green kana patterns 31, 32 are displayed, so that the user can create mail sentences in a state where the kana patterns 31, 32 are easy to see since green and red are complementary. Next, whether an input switching button for changing an input method is pushed by the user or not is judged (step S4). In case that the user is continually using the kana input (In case of no), the procedure proceeds to a step S9 and whether a mail input ending operation has been performed or not is judged. The end of the mail input is performed by judging whether a mail memory button operated at the mail creation completing time or a release button (for example, a power button) for releasing the mail creating mode is operated or not.

If it is judged in this step (S9) that the mail input has completed (In case of yes), this control is completed. On the other hand, in the case that it is judged that the mail input has not been completed yet (in case of no), the procedure returns to the step S4 and the mail creating operation is continued. In case that it is judged that the user pushes the input switching button during this mail creating operation (step S4: yes), whether an input mode set by the operation of its input switching button is the kana input mode or not is judged (step S5). In the case that the user operates the input switching button and resultantly the input mode is kept the kana input mode (In case of yes), the lighting color of the backlight is not changed to be kept red, and the procedure proceeds to the step 9.

In the case that the user operates the input switching button and resultantly sets another input mode than the kana input mode (In case of no), whether the English character input mode is set or not is judged (step S6). Here, in case that it is judged that the English character input mode is set (in case of yes), the green LED 52 is caused to emit the light so that the lighting color of the backlight becomes green (step S7). In this state, in the key tops 11, 12 that are lighting up in green, the red English character patterns 41, 42 are displayed, so that the user can execute the mail creating operation in a state where the English character patterns 41, 42 is easy to see since its color and green are complementary.

If it is judged that the English character input is not set (In case of yes), i.e., if it is judged that neither the kana input mode nor the English character input mode but the numeral input mode is set, both the red LED 51 and the green LED 52 are caused to emit the light so that the lighting color of the backlight becomes orange (step 8). In this state, in the key tops 11, 12 that are lighting up in orange, the black numeral patterns 21, 22 are displayed, so that the user can execute the mail creating operation in a state where the numeral patterns 21, 22 are easy to see since its color and orange are complementary. Then, after the lighting color of the backlight is changed in the step 7 or 8, the procedure proceeds to the step 9.

As described above, every time the user operates the input switching button to set the input method during the mail creating operation, the lighting color of the backlight is changed and the color of the pattern used in the set input method becomes the complementary color in relation to the lighting color of the backlight, so that the patterns can be conspicuous in the key tops 11, 12 and the operational efficiency of the button by the user improves extremely.

In the above embodiment, the mail creating operation is taken as one example of the invention, and switching of the lighting color of the backlight is controlled according to the mode (any one of the kana input mode, the English character input mode, and the numeral input mode) set by the user, correspondingly to the printed color of the pattern used in its set mode. Therefore, such an effect can be obtained that the patterns utilized in the set mode are conspicuous in the key top 11, 12.

In the above embodiment, the switching control of the lighting color of the backlight corresponding to the mode set during the mail creating operation is described, however the invention is not limited to this. For example, in case that the user has pushed a speaking button to set a speaking mode, both the red LED 51 and the green LED 52 are caused to emit the light so that the lighting color of the backlight becomes orange, and the black numeral patterns 21, 22 are displayed in the key tops 11, 12 that light up in orange.

Further, as another embodiment, in an address register function in which a name and a telephone number are registered in pairs, in a name input mode, the red LED 51 is caused to emit the light so that the lighting color of the backlight becomes red, and the green kana patterns 31, 32 are displayed in the key tops 11, 12 that light up in red; and in a telephone number input mode, both the red LED 51 and the green LED 52 are caused to emit the light so that the lighting color of the backlight becomes orange, and the black numeral patterns 21, 22 are displayed in the key tops 11, 12 that light up in orange.

As described above, in the embodiments of the invention, switching of the lighting color of the backlight is controlled according to the mode set by the user, correspondingly to the printed color of the pattern used in its set mode. In these embodiments, though the invention is applied to the portable telephone, it is not limited to this and can be applied to all the electronic devices such as a remote controller that is representative of a portable information terminal, and the like.

In the above embodiments, the relation between the color of the patterns displayed in the key tops 11, 12 and the lighting color of the backlight is set so that they become complementary and the color of the pattern is conspicuous, that is, set so that in relation to the green kana patterns 31, 32, the lighting color of the backlight becomes red; in relation to the red English character patterns 41, 42, the lighting color of the backlight becomes green; and in relation to the black numeral patterns 21, 22, the lighting color of the backlight becomes orange. The invention is not limited to these color arrangements, and it is desirable that the relation between the color of the patterns displayed in the key tops 11, 12 and the lighting color of the backlight is formed so that they become complementary and the color of the pattern is conspicuous.

As described above, in the invention, switching of the lighting color of the backlight is controlled according to the mode set by the user, correspondingly to the printed color of the pattern used in its set mode. Therefore, such an effect can be obtained that the pattern utilized in the set mode is conspicuous in the key top.

Hereby, even in the button in which plural different kinds of patterns are displayed, the pattern necessary for the input at each occasion can be conspicuous. Therefore, the operational efficiency of the button by the user extremely improves.

What is claimed is:

1. An electronic device, comprising:
   a button having at least a first pattern and a second pattern; and
   a lighting device that emits at least a first lighting color and a second lighting color to illuminate the button,
   wherein the first pattern has a first pattern color and the second pattern has a second pattern color;
   wherein said button comprises at least said first pattern having said first pattern color, said second pattern having said second pattern color, and a third pattern having a third pattern color.

2. An electronic device as claimed in claim 1, wherein said third pattern color is substantially different than a combination color,
   wherein said combination color is a combination of said first lighting color and said second lighting color,
   wherein said lighting device emits said combination color by simultaneously emitting both said first lighting color and said second lighting color, and
   wherein said third pattern is easy for a user to see when said lighting device emits said combination color.

3. An electronic device as claimed in claim 2, wherein said third pattern is difficult for a user to see when said lighting device emits only one of said first lighting color and said second lighting color.

4. An electronic device as claimed in claim 2, wherein said third pattern color is a complement of said combination color.

5. An electronic device as claimed in claim 2, wherein said first pattern color is substantially different than said second lighting color,
   wherein said second pattern color is substantially different than said first lighting color,
   wherein said second pattern is easy for said user to see when said lighting device emits said first lighting color, and
   wherein said first pattern is easy for said user to see when said lighting device emits said second lighting color.

6. An electronic device as claimed in claim 2, wherein said first pattern color is substantially the same as said first lighting color,
   wherein said second pattern color is substantially the same as said second lighting color,
   wherein said first pattern is difficult for said user to see when said lighting device emits said first lighting color, and
   wherein said second pattern is difficult for said user to see when said lighting device emits said second lighting color.

7. An electronic device as claimed in claim 2, wherein said first pattern is more easily seen than said second pattern and said third pattern when said lighting device emits said second lighting color and does not emit said first lighting color,
   wherein said second pattern is more easily seen than said first pattern and said third pattern when said lighting device emits said first lighting color and does not emit said second lighting color, and
   wherein said third pattern is more easily seen than said first pattern and said second pattern when said lighting device emits said combination color.

8. An electronic device as claimed in claim 7, wherein said first pattern color is a complement of said second lighting color, and
   wherein said second pattern color is a complement of said first lighting color, and
   wherein said third pattern color is a complement of said combination color.

9. An electronic device, comprising;
   a button comprising at least a first pattern having a first pattern color, a second pattern having a second pattern color, and a third pattern having a third pattern color; and
   a lighting device that emits at least a first lighting color, a second lighting color, and a combination color to illuminate the button,
   wherein the lighting device emits the combination color as a combination of said first lighting color and said second lighting color by simultaneously emitting both said first lighting color and said second lighting color,
   wherein said first pattern color is substantially different than said second lighting color,
   wherein said second pattern color is substantially different than said first lighting color, and
   wherein said third pattern color is substantially different than said combination lighting color.

10. An electronic device as claimed in claim 9, wherein said third pattern is easy for a user to see when said lighting device emits said combination color.

11. An electronic device as claimed in claim 9, wherein said second pattern is easy for said user to see when said lighting device emits said first lighting color, and
    wherein said first pattern is easy for said user to see when said lighting device emits said second lighting color.

12. An electronic device as claimed in claim 10, wherein said second pattern is easy for said user to see when said lighting device emits said first lighting color, and
    wherein said first pattern is easy for said user to see when said lighting device emits said second lighting color.

13. A portable phone, comprising:
    a button having at least a first pattern and a second pattern; and
    a lighting device that emits at least a first lighting color and a second lighting color to illuminate the button,
    wherein the lighting device illuminates the button with the first lighting color while a speaking mode is set, and
    wherein the first lighting color is substantially different than a color of at least one of the first pattern and the second pattern.

14. An electronic device having an address register function in which a name and a telephone number are registered in pairs, the electronic device comprising:
    a button having at least a first pattern and a second pattern, the first pattern including a numerical pattern, the second pattern including a letter pattern; and
    a lighting device that emits at least a first lighting color and a second lighting color to illuminate the button,
    wherein the lighting device illuminates the button with the first lighting color while a name input mode is set,
    wherein the lighting device illuminates the button with the second lighting color while a telephone number input mode is set,
    wherein the first lighting color is substantially different than a color of the second pattern, and
    wherein the second lighting color is substantially different than a color of the first pattern.

* * * * *